(12) United States Patent
Yan et al.

(10) Patent No.: US 11,087,474 B2
(45) Date of Patent: Aug. 10, 2021

(54) METHOD, APPARATUS, DEVICE, AND STORAGE MEDIUM FOR CALIBRATING POSTURE OF MOVING OBSTACLE

(71) Applicant: BAIDU ONLINE NETWORK TECHNOLOGY (BEIJING) CO., LTD., Beijing (CN)

(72) Inventors: Feilong Yan, Beijing (CN); Jin Fang, Beijing (CN); Tongtong Zhao, Beijing (CN); Liang Wang, Beijing (CN); Yu Ma, Beijing (CN); Ruigang Yang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 111 days.

(21) Appl. No.: 16/556,772

(22) Filed: Aug. 30, 2019

(65) Prior Publication Data

US 2020/0074641 A1 Mar. 5, 2020

(30) Foreign Application Priority Data

Aug. 30, 2018 (CN) .......................... 201811002588.9

(51) Int. Cl.
*G06T 7/207* (2017.01)
*G06T 7/579* (2017.01)
*G06T 7/11* (2017.01)
*G06T 7/246* (2017.01)
*G06K 9/00* (2006.01)

(52) U.S. Cl.
CPC .......... *G06T 7/207* (2017.01); *G06K 9/00805* (2013.01); *G06T 7/11* (2017.01);
(Continued)

(58) Field of Classification Search
CPC . G06T 7/207; G06T 7/579; G06T 7/11; G06T 7/246; G06T 2207/10028;
(Continued)

(56) References Cited

U.S. PATENT DOCUMENTS 7,317,456 B1 * 1/2008 Lee .......................... G06T 15/08
345/427
10,628,712 B2 4/2020 Jiang et al.
(Continued)

FOREIGN PATENT DOCUMENTS

CN 103047943 A * 4/2013
JP 2016045330 A 4/2016
(Continued)

OTHER PUBLICATIONS

Office Action of Japanese Application No. 2019-157032, dated Jun. 15, 2020, 4 pages.
(Continued)

*Primary Examiner* — Charles T Shedrick
(74) *Attorney, Agent, or Firm* — Fay Sharpe LLP

(57) ABSTRACT

A method, an apparatus, a device, and a medium for calibrating a posture of a moving obstacle are provided. The method includes: obtaining a 3D map, the 3D map including first static obstacles; selecting a target frame of data, the target frame of data including second static obstacles and one or more moving obstacles; determining posture information of each of the one or more moving obstacles in a coordinate system of the 3D map; registering the target frame of data with the 3D map; determining posture offset information of the target frame of data in the coordinate system according to a registration result; calibrating the posture information of each of the one or more moving obstacles according to the posture offset information; and adding each of the one or more moving obstacles after the calibrating into the 3D map.

15 Claims, 5 Drawing Sheets

(52) U.S. Cl.
CPC .............. *G06T 7/246* (2017.01); *G06T 7/579* (2017.01); *G06T 2207/10028* (2013.01); *G06T 2207/30261* (2013.01)

(58) Field of Classification Search
CPC . G06T 2207/30261; G06T 2207/20016; G06T 7/74; G06T 7/337; G06T 7/33; G06T 7/70; G06T 15/02; G06K 9/00805
See application file for complete search history.

(56) References Cited

U.S. PATENT DOCUMENTS

| | | | |
|---|---|---|---|
| 2017/0124687 A1* | 5/2017 | McCloskey | G06K 7/1456 |
| 2019/0139266 A1* | 5/2019 | Budagavi | G06T 17/00 |
| 2019/0272671 A1 | 9/2019 | Zhang et al. | |

FOREIGN PATENT DOCUMENTS

| | | |
|---|---|---|
| KR | 20180041176 A | 4/2018 |
| WO | 2018072630 A1 | 4/2018 |

OTHER PUBLICATIONS

David Gillsjo, "Moving Object Detection in Urban Environments", Institution for Systemteknic Department of Electrical Engineering, Dated Sep. 24, 2012, 59 pages.
Andreas Nuechter, "6d slam 3d mapping outdoor environments", 2007, 1 page.
Extended European Search Report for EP Application No. 19194511. 2, dated Dec. 12, 2019, 10 pages.

* cited by examiner

US 11,087,474 B2

METHOD, APPARATUS, DEVICE, AND STORAGE MEDIUM FOR CALIBRATING POSTURE OF MOVING OBSTACLE

CROSS-REFERENCE TO RELATED APPLICATIONS

This application is based upon and claims priority to Chinese Patent Application No. 201811002588.9, filed Aug. 30, 2018, the entire contents of which are incorporated herein by reference.

FIELD

Embodiments of the present disclosure relate to point cloud data processing technologies, and more particularly, to a method, an apparatus, a device, and a storage medium for calibrating a posture of a moving obstacle.

BACKGROUND

Simulation technologies of point cloud data is to virtualize point cloud data with a high sense of reality, based on point cloud data of a target scene and a computer-aided-design model, which may be employed to construct large-scale scenes. For example, a variety of road scenes are constructed for training a 3D perception module for unmanned driving. Generally, the simulation of point cloud data may include three primary aspects: generating a 3D map; simulating states of obstacles; and simulating working principles of sensors. The state of the obstacle usually refers to a position and an orientation of the obstacle at a certain time.

In the related art, a method for obtaining the position and the orientation of the obstacle in the scene may include: detecting roughly obstacles from road data collected really; and transforming a distribution of the obstacles into a 3D map through positioning information of the obstacles.

However, the position and the orientation of the obstacle obtained according to the method in the related art has a deviation of meters or even tens of meters in a lateral direction, a longitudinal direction and a vertical direction respectively compared with real position and orientation of the obstacle, meanwhile, varying degrees of error also exist in three angles of pitch, roll, and yaw. Thus, the positioning information of the obstacle in the related art has the large error.

SUMMARY

A first aspect of embodiments of the present disclosure provides a method for calibrating a posture of a moving obstacle. The method includes: obtaining a 3D map, the 3D map comprising first static obstacles; selecting a frame of point cloud data associated with the 3D map as a target frame of data, the target frame of data comprising second static obstacles and one or more moving obstacles; determining posture information of each of the one or more moving obstacles in a coordinate system of the 3D map; registering the target frame of data with the 3D map; determining posture offset information of the target frame of data in the coordinate system according to a registration result; calibrating the posture information of each of the one or more moving obstacles according to the posture offset information; and adding each of the one or more moving obstacles after the calibrating into the 3D map.

A second aspect of embodiments of the present disclosure provides a device. The device includes one or more processors, and a memory configured to store one or more programs. When the one or more programs are executed by the one or more processors, the one or more processors are caused to perform the method according to the first aspect of embodiments of the present disclosure.

A third aspect of embodiments of the present disclosure provides a computer readable storage medium, stored thereon with computer programs that, when executed by a processor, perform the method according to the first aspect of embodiments of the present disclosure.

DETAILED DESCRIPTION

The present disclosure will be described in detail below with reference to the accompanying drawings and the embodiments. The specific embodiments described herein are only used to explain the present disclosure rather than to limit the present disclosure. In addition, it should be noted that, for convenience of description, only part but not all structures related to the present disclosure are illustrated in the accompanying drawings.

Figure 1:
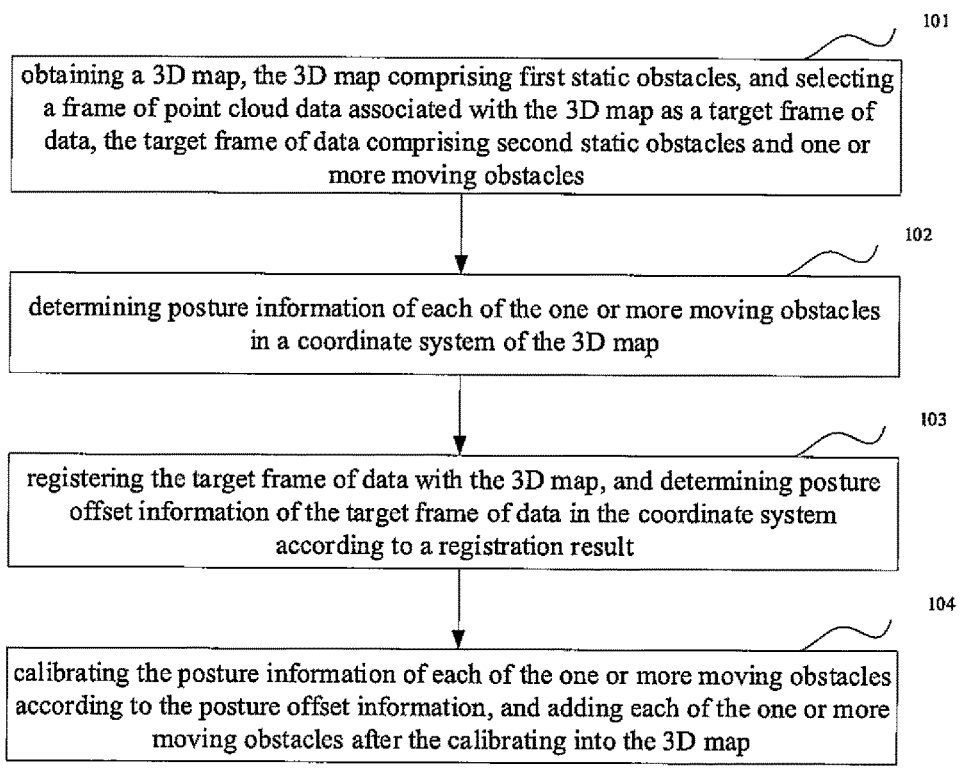
FIG. 1 is a flow chart of a method for calibrating a posture of a moving obstacle according to an embodiment of the present disclosure.

FIG. 1 is a flow chart of a method for calibrating a posture of a moving obstacle according to an embodiment of the present disclosure. The embodiment may be applicable to a calibration of posture of a moving obstacle. The method may be implemented by an apparatus for calibrating a posture of a moving obstacle. The apparatus may be implemented in software and/or hardware. The apparatus may be configured in a computer device. As illustrated in FIG. 1, the method includes acts in the following blocks.

At block 101, a 3D (three-dimensional) map is obtained, and a frame of point cloud data associated with the 3D map is selected as a target frame of data. The 3D map includes first static obstacles. The target frame of data includes second static obstacles and one or more moving obstacles.

The 3D map is generated based on frames of point cloud data. A 3D laser scanner may scan an actual scene to obtain the frames of point cloud data. The static obstacle is an immovable object in the scene, such as a waste container, a utility pole. The moving obstacle is a movable object in the scene, such as a vehicle, a passerby. The 3D map is a map generated according to the immovable objects such as roads, walls and the like in the scene (excluding the movable objects in the scene). The 3D map only includes the static obstacles. The frame of point cloud data associated with the 3D map may be original data for generating the 3D map. Or the frame of point cloud data is obtained through scanning an actual scene corresponding to the 3D map. The frame of point cloud data may include the static obstacles and the one or more moving obstacles. A way of obtaining the frame of point cloud data may be same with or different from a way of obtaining data for generating the 3D map. For example, the data for generating the 3D map may be collected by any collection device, and the frame of point cloud data may be collected by a road scanner.

At block 102, posture information of each of the one or more moving obstacles (included in the target frame of data) in a coordinate system of the 3D map is determined.

Taking the coordinate system of the 3D map as a global coordinate system, the target frame of data may be transformed into the coordinate system of the 3D map through coordinate rotation and translation. That is, each static obstacle and each moving obstacle in the target frame of data may be transformed to the coordinate system of the 3D map.

The posture information of each moving obstacle included in the target frame of data in the coordinate system of the 3D map is determined. The posture information is a position and an orientation of the object in the coordinate system. The position is coordinate information of the moving obstacle in a lateral direction, a longitudinal direction, and a vertical direction. The orientation is angle information of the moving obstacle in three angles of pitch, roll, and yaw.

The moving obstacle included in the target frame of data is transformed to the coordinate system through the coordinate rotation and translation, and the posture information of the moving obstacle included in the target frame of data in the coordinate system of the 3D map may be determined. Compared with the real position and orientation of the obstacle, the posture information of the moving obstacle included in the target frame of data in the coordinate system of the 3D map may have a deviation of 0 to 30 meters in a lateral direction, a longitudinal direction and a vertical direction respectively, and varying degrees of error also in the three angles of pitch, roll, and yaw respectively. Thus, the posture information of the moving obstacle determined after the transformation needs to be corrected before it may be used.

At block 103, the target frame of data is registered with the 3D map to obtain a registration result, and posture offset information of the target frame of data in the coordinate system is determined according to the registration result.

The 3D map includes the static obstacles, and the target frame of data includes the static obstacles and the one or more moving obstacles. There is no corresponding moving obstacle in the 3D map that may be registered with the moving obstacle in the target frame of data. However, the 3D map includes the static obstacles, and the target frame of data also includes the static obstacles. The static obstacle and the moving obstacle in the target frame of data may be in the same coordinate system, and relative positions of them are fixed. Thus, the posture offset information of the static obstacle in the target frame of data in the coordinate system is the posture offset information of the moving obstacle in the target frame of data in the coordinate system, which may be taken as the posture offset information of the target frame of data in the coordinate system.

The static obstacle in the target frame of data is obtained as a reference obstacle. The target frame of data is registered with the 3D map according to the posture information of the static obstacle matching with the reference obstacle in the coordinate system, and the posture information of the reference obstacle in the coordinate system. In detail, the reference obstacle is aligned with the static obstacle matching with the reference obstacle, and the posture information of the reference obstacle is registered to be consistent with the posture information of the matched static obstacle. The posture information of the reference obstacle is obtained after the registration.

The posture offset information of the static obstacle in the target frame of data in the coordinate system is offset information of the posture information of the reference obstacle in the coordinate system after the registration with respect to the posture information of the reference obstacle determined after the coordinate transformation. After obtaining the posture information of the reference obstacle after the registration, the posture offset information of the target frame of data in the coordinate system is determined according to the posture information of the reference obstacle in the coordinate system after the registration and the posture information of the reference obstacle determined after the coordinate transformation.

In detail, the posture offset information may be position offset information of the posture information of the reference obstacle in the coordinate system after the registration with respect to the posture information of the reference obstacle determined after the coordinate transformation in the lateral direction, the longitudinal direction and the vertical direction. The posture offset information may be angle offset information of the posture information of the reference obstacle in the coordinate system after the registration with respect to the posture information of the reference obstacle determined after the coordinate transformation in the three angles of pitch, roll, and yaw.

At block 104, the posture information of each of the one or more moving obstacles is calibrated according to the posture offset information, and each of the one or more moving obstacles after the calibrating is added into the 3D map.

The posture offset information of the static obstacle in the target frame of data in the coordinate system is the posture offset information of the moving obstacle in the target frame of data in the coordinate system. Thus, the posture information of the moving obstacle determined after the transformation may be calibrated according to the posture offset information of the static obstacle in the target frame of data in the coordinate system.

In detail, the position of the moving obstacle determined after the transformation is calibrated according to the position offset information, and the orientation of the moving obstacle determined after the transformation is calibrated according to the angle offset information. And then the moving obstacle is added into the 3D map according to the posture information after the calibration.

With the method for calibrating the posture of the moving obstacle provided by embodiments of the present disclosure, the frame of point cloud data associated with the 3D map is selected as the target frame of data, in which the 3D map includes the static obstacles, and the target frame of data includes the static obstacles and the one or more moving obstacles; the target frame of data is registered with the 3D map to obtain a registration result, and the posture offset information of the target frame of data in the coordinate system is determined according to the registration result; and the posture information of the moving obstacle (included in the target frame of data) in the coordinate system of the 3D map is calibrated according to the posture offset information. The method may correct the position and the orientation of the obstacle during the simulation of point cloud data, to reduce errors and improve an accuracy.

Figure 2:
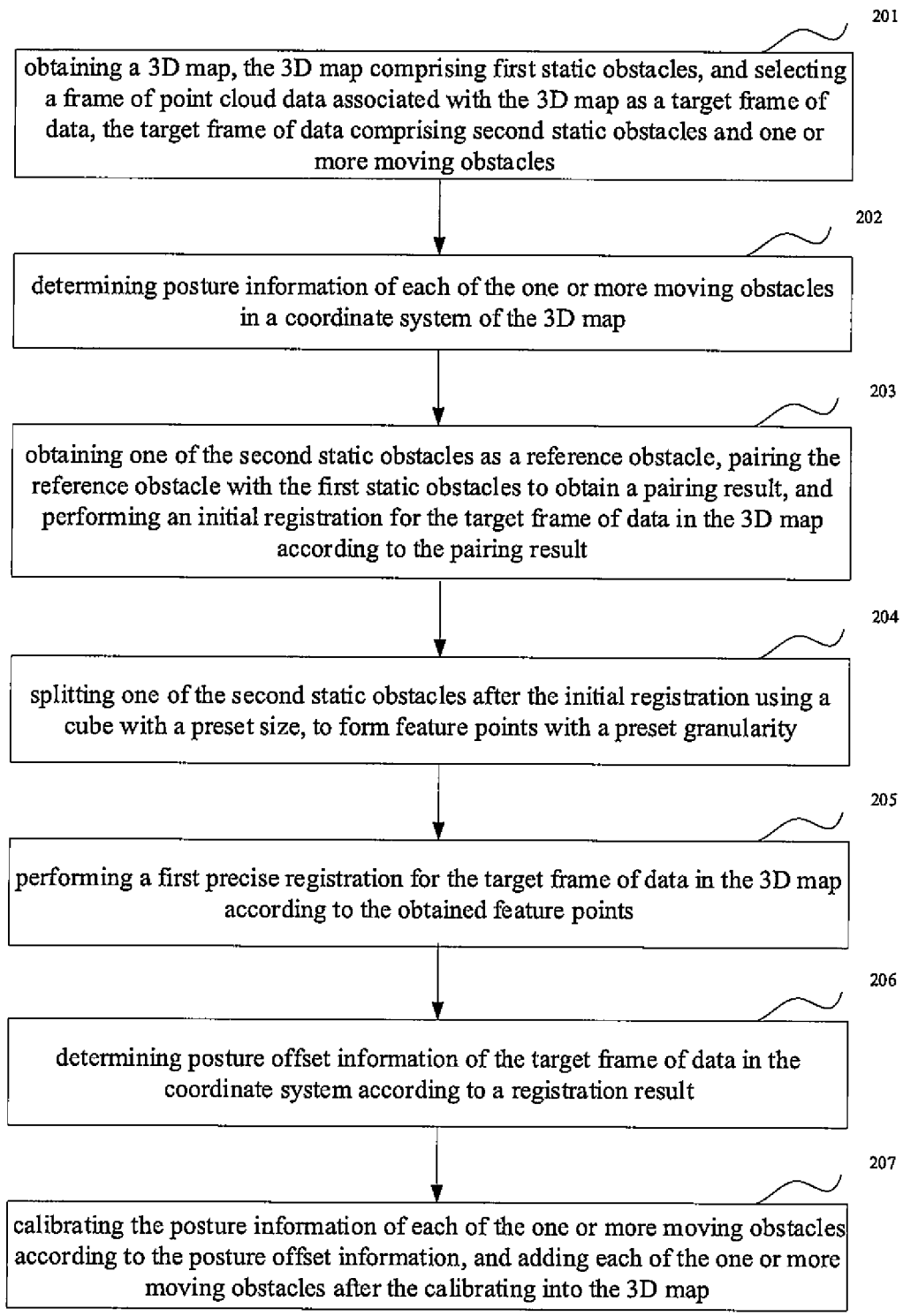
FIG. 2 is a flow chart of a method for calibrating a posture of a moving obstacle according to an embodiment of the present disclosure.

FIG. 2 is a flow chart of a method for calibrating a posture of a moving obstacle according to an embodiment of the present disclosure. The present embodiment shows more details about the embodiment illustrated in FIG. 1. In the embodiment, registering the target frame of data with the 3D map may include: obtaining one of the second static obstacles as a reference obstacle; pairing the reference obstacle with the first static obstacles to obtain a pairing result; performing an initial registration for the target frame of data in the 3D map according to the pairing result; splitting one of the second static obstacles after the initial registration using a cube with a preset size, to form feature points with a preset granularity; and performing a first precise registration for the target frame of data in the 3D map according to the obtained feature points.

As illustrated in FIG. 2, the method includes acts in the following blocks.

At block 201, a 3D map is obtained, and a frame of point cloud data associated with the 3D map is selected as a target frame of data. The 3D map includes first static obstacles. The target frame of data includes second static obstacles and one or more moving obstacles.

At block 202, posture information of each of the one or more moving obstacles included in the target frame of data in a coordinate system of the 3D map is determined.

At block 203, one of the second static obstacles is obtained as a reference obstacle, and the reference obstacle is paired with the first static obstacles in the 3D map to obtain a pairing result, and the initial registration for the target frame of data in the 3D map is performed according to the pairing result.

The static obstacle with specified semantic information, such as a ground, a telegraph pole, a tree and a wall, in the 3D map is recognized using an obstacle detection algorithm. Similarly, the static obstacle with specified semantic information in the target frame of data is also recognized using the obstacle detection algorithm.

The static obstacle with the specified semantic information recognized from the target frame of data is taken as the reference obstacle. The reference obstacle is paired with the static obstacle included in the 3D map, the static obstacle matching with the reference obstacle in the 3D map is determined, and the initial registration for the target frame of data in the 3D map is performed according to the pairing result. In detail, the reference obstacle is aligned with the static obstacle matching with the reference obstacle, and the posture information of the reference obstacle is registered to be consistent with the posture information of the static obstacle matching with the reference obstacle.

At block 204, one of the second static obstacles after the initial registration is split using a cube with a preset size, to form feature points of a preset granularity.

In order to register the target frame of data with the 3D map more precisely, each static obstacle included in the target frame of data after the initial registration is split with the cube with the preset size, such as the cube of 20 cm×20 cm×20 cm, to form the feature points with the preset granularity. Correspondingly, each static obstacle matching with the reference obstacle in the 3D map after the initial registration is split with the cube with the preset size to form the feature points with the preset granularity.

At block 205, a first precise registration for the target frame of data in the 3D map is performed according to the obtained feature points.

The first precise registration is to further align the reference obstacle with the static obstacle matching with the reference obstacle according to the feature points obtained after the splitting through a RANSAC (Random sample consensus), to register the target frame of data after the initial registration more precisely with the 3D map. The error of the first precise registration is usually less than 1 m.

Alternatively, after performing the first precise registration for the target frame of data in the 3D map according to the obtained feature point, the method may further includes: performing a second precise registration for the target frame of data in the 3D map after the first precise registration using a point-to-point registration technique.

The second precise registration is to employ the point-to-point registration technique to: for each point in the point cloud data of the reference obstacle, search for a nearest point with a same category as the each point within a preset distance range, such as 1 m, and transform the each point and its corresponding nearest point by a least-square transformation to further align the reference obstacle and the static obstacle matching with the reference obstacle. That is, the target frame of data after the first precise registration is more precisely registered in the 3D map according to each point in the point cloud data.

At block 206, posture offset information of the target frame of data in the coordinate system is determined according to a registration result.

At block 207, the posture information of each of the one or more moving obstacles is calibrated according to the posture offset information, and each of the one or more moving obstacles after the calibrating is added into the 3D map.

With the method for calibrating the posture of the moving obstacle provided by embodiments of the present disclosure, the reference obstacle is paired with the static obstacle included in the 3D map, and the initial registration for the target frame of data in the 3D map is performed according to the pairing result; the static obstacle included in the target frame of data after the initial registration is split using the cube with the preset size, to form the feature points of the preset granularity; and the first precise registration for the target frame of data in the 3D map is performed according to the obtained feature points. Thus, the target frame of data may be more precisely registered in the 3D map according to the reference obstacle, the feature points after the splitting, and each point in the point cloud data.

Figure 3:
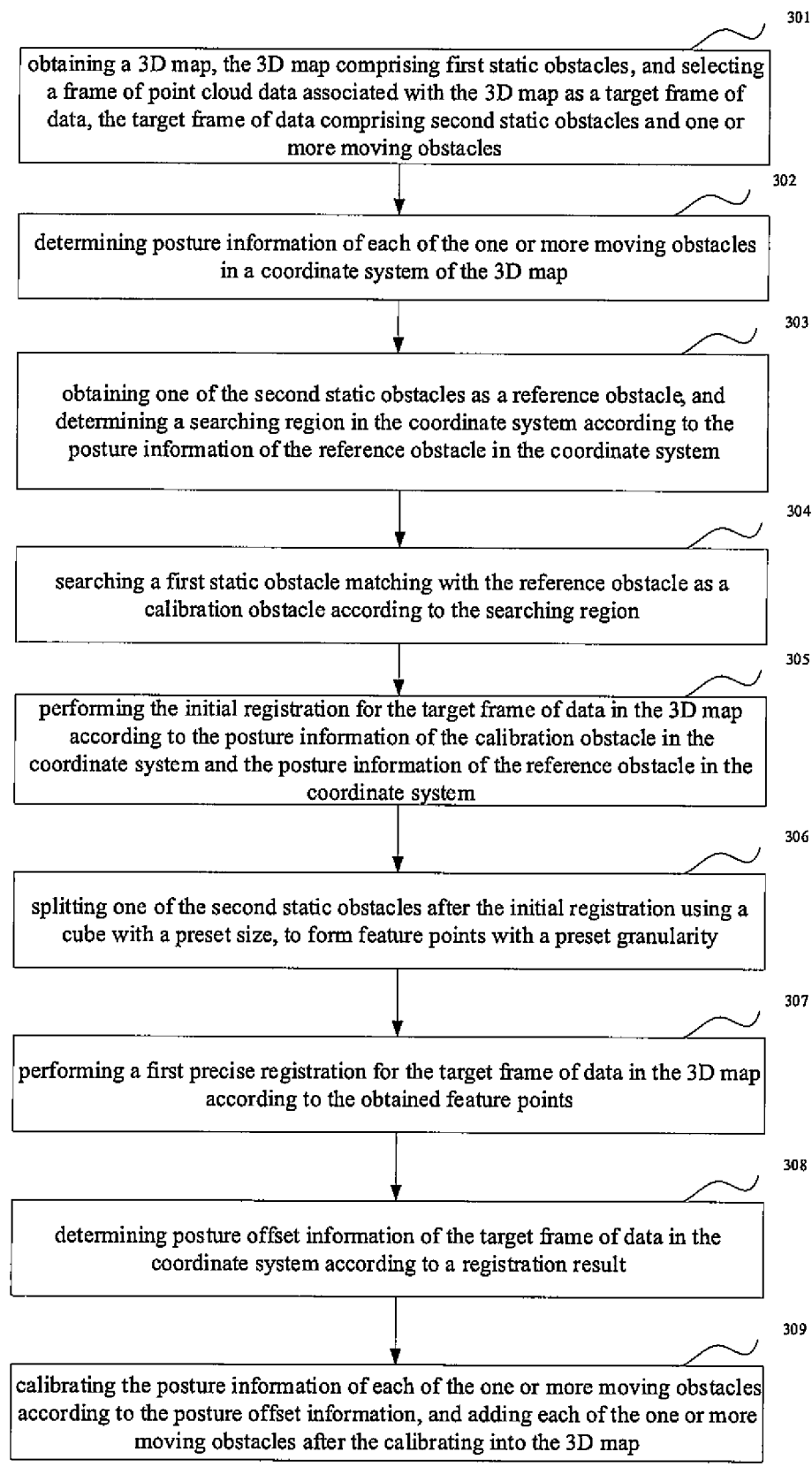
FIG. 3 is a flow chart of a method for calibrating a posture of a moving obstacle according to an embodiment of the present disclosure.

FIG. 3 is a flow chart of a method for calibrating a posture of a moving obstacle according to an embodiment of the present disclosure. The present embodiment shows more details about the embodiment illustrated in FIG. 2. In the embodiment, pairing the reference obstacle with the first static obstacles to obtain the pairing result, and performing the initial registration for the target frame of data in the 3D map according to the pairing result include: determining a searching region in the coordinate system according to the posture information of the reference obstacle in the coordinate system; searching a first static obstacle matching with the reference obstacle as a calibration obstacle according to the searching region; and performing the initial registration for the target frame of data in the 3D map according to the posture information of the calibration obstacle in the coordinate system and the posture information of the reference obstacle in the coordinate system.

As illustrated in FIG. 3, the method includes acts in the following blocks.

At block 301, a 3D map is obtained, and a frame of point cloud data associated with the 3D map is selected as a target frame of data. The 3D map includes first static obstacles. The target frame of data includes second static obstacles and one or more moving obstacles.

At block 302, posture information of each of the one or more moving obstacles included in the target frame of data in a coordinate system of the 3D map is determined.

At block 303, one of the second static obstacles is obtained as a reference obstacle, a searching region in the coordinate system is determined according to the posture information of the reference obstacle in the coordinate system.

The posture information is the position and the orientation of the object in the coordinate system. The searching region in the coordinate system is determined according to the position of the reference obstacle. Alternatively, the position of the reference obstacle is taken as an origin, and the searching region is set according to a region determined by a preset distance. For example, the position of the reference obstacle is taken as the origin, a circle with a radius of 100 meters is determined, and the region inside the circle is the search area.

Alternatively, before determining the searching region in the coordinate system according to the posture information of the reference obstacle in the coordinate system, the method further includes: deleting the one or more moving obstacles from the target frame of data.

In the embodiment of the present disclosure, the static obstacle in the target frame of data is needed to be obtained as the reference obstacle, the target frame of data is registered with the 3D map according to the posture information of the static obstacle matching with the reference obstacle in the coordinate system and the posture information of the reference obstacle in the coordinate system. Thus, before the registration, the moving obstacle included in the target frame of data may be deleted, and the static obstacle included in the target frame of data may be preserved, so as to reduce an interference of the moving obstacle to a subsequent registration process, further ensuring the accuracy of registration.

At block 304, a first static obstacle matching with the reference obstacle is searched as a calibration obstacle according to the searching region.

The first static obstacle matching with the reference obstacle is searched as the calibration obstacle in the searching region in the 3D map. The static obstacle with the specified semantic information recognized from the target frame of data is taken as the reference obstacle. The static obstacle may include: a ground, a telegraph pole, a tree and a wall. The reference obstacle is paired with the static obstacle included in the 3D map, and the static obstacle matching with the reference obstacle in the 3D map is determined. The first static obstacle matching with the reference obstacle is taken as the calibration obstacle. The posture information of the calibration obstacle is an ideal posture information of the reference obstacle.

At block 305, the initial registration is performed for the target frame of data in the 3D map according to the posture information of the calibration obstacle in the coordinate system and the posture information of the reference obstacle in the coordinate system.

The initial registration is to align the reference obstacle and the calibration obstacle according to the posture information of the calibration obstacle in the coordinate system and the posture information of the reference obstacle in the coordinate system. The posture information of the reference obstacle is registered to be consistent with the posture information of the calibration obstacle.

At block 306, one of the second static obstacles after the initial registration is split using a cube with a preset size, to form feature points of a preset granularity.

At block 307, a first precise registration for the target frame of data in the 3D map is performed according to the obtained feature points.

At block 308, posture offset information of the target frame of data in the coordinate system is determined according to a registration result.

At block 309, the posture information of each of the one or more moving obstacles is calibrated according to the posture offset information, and each of the one or more moving obstacles after the calibrating is added into the 3D map.

With the method for calibrating the posture of the moving obstacle provided by embodiments of the present disclosure, the searching region in the coordinate system is determined according to the posture information of the reference obstacle in the coordinate system, the obstacle matching with the reference obstacle is searched as the calibration obstacle in the 3D map according to the searching region, and the initial registration for the target frame of data is performed in the 3D map according to the posture information of the calibration obstacle in the coordinate system and the posture information of the reference obstacle in the coordinate system. Through setting the searching region, the static obstacle matching with the reference obstacle may be quickly obtained to reduce a calculation amount.

Figure 4:
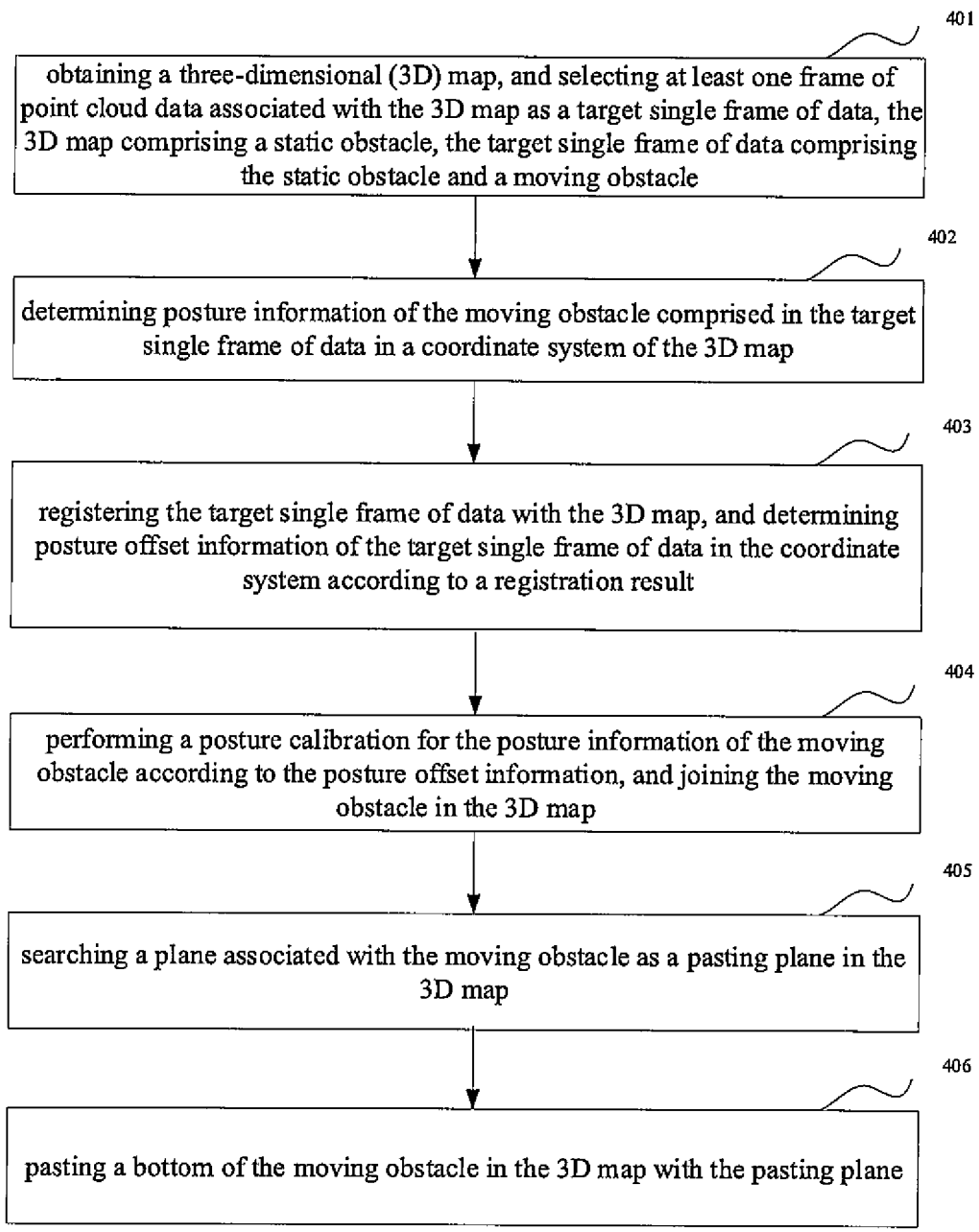
FIG. 4 is a flow chart of a method for calibrating a posture of a moving obstacle according to an embodiment of the present disclosure.

FIG. 4 is a flow chart of a method for calibrating a posture of a moving obstacle according to an embodiment of the present disclosure. This embodiment is embodied based on any one of the above embodiments. In the embodiment, after adding each of the one or more moving obstacles into the 3D map after the calibrating, the method further includes: searching a plane associated with each of the one or more moving obstacles as a pasting plane in the 3D map; and pasting a bottom of each of the one or more moving obstacles in the 3D map with the pasting plane.

As illustrated in FIG. 4, the method includes acts in the following blocks.

At block 401, a 3D map is obtained, and a frame of point cloud data associated with the 3D map is selected as a target frame of data. The 3D map includes first static obstacles. The target frame of data includes second static obstacles and one or more moving obstacles.

At block 402, posture information of each of the one or more moving obstacles (included in the target frame of data) in a coordinate system of the 3D map is determined.

At block 403, the target frame of data is registered with the 3D map to obtain a registration result, and posture offset information of the target frame of data in the coordinate system is determined according to the registration result.

At block 404, the posture information of each of the one or more moving obstacles is calibrated according to the posture offset information, and each of the one or more moving obstacles after the calibrating is added into the 3D map.

At block 405, a plane associated with each of the one or more moving obstacles is searched as a pasting plane in the 3D map.

Since the target frame of data may have some degrees of distortion, for example, the bottom of the moving obstacle may not fit any plane and be in a suspended state, after adding the moving obstacle to the 3D map, it is necessary to search the plane associated with the moving obstacle as the pasting plane in the 3D map.

Alternatively, a nearest plane is searched under each moving obstacle as the pasting plane.

Alternatively, the plane associated with the moving obstacle is searched as the pasting plane in the 3D map, which may include: when at least two planes included in a set region associated with the same moving obstacle in the 3D map, obtaining a movement track of a road collecting device associated with the 3D map; determining the pasting plane from the at least two planes according to the movement track of the road collecting device.

In the 3D map, at least two planes may be included in the set region associated with the same moving obstacle. For example, the moving obstacle locates in a road condition of an overpass or other intersections. The movement track of the road collecting device associated with the 3D map is obtained, and the nearest plane below the movement track of the road collecting device is searched from the at least two planes and is taken as a road matching with the movement track of road mining device, that is, the pasting plane corresponding to the moving obstacle.

At block 406, a bottom of each of the one or more moving obstacles in the 3D map is pasted with the pasting plane.

The bottom of the moving obstacle is pasted with the corresponding pasting plane, so that the moving obstacle is no longer in the suspended state.

With the method for calibrating the posture of the moving obstacle provided by embodiments of the present disclosure, the plane associated with the moving obstacle is searched as the pasting plane in the 3D map, and the bottom of the moving obstacle in the 3D map is pasted with the pasting plane. The moving obstacle may be further fine adjusted to ensure that the bottom of each moving obstacle is pasted with the corresponding plane and is no longer in the suspended state.

Figure 5:
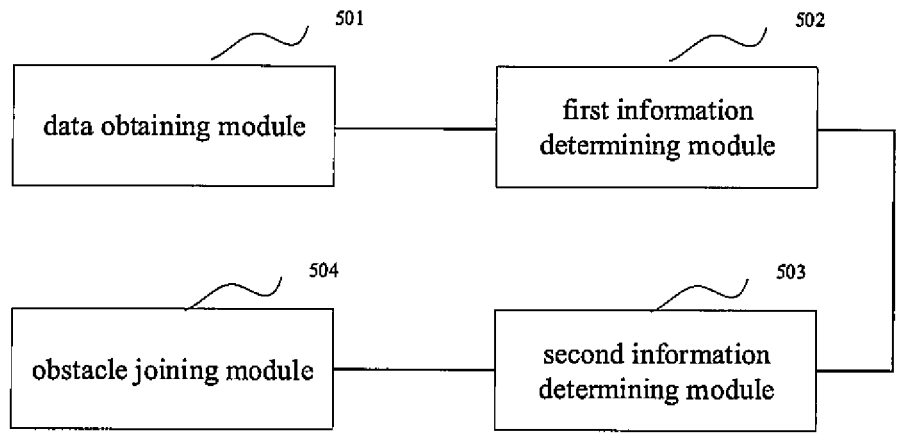
FIG. 5 is a block diagram of an apparatus for calibrating a posture of a moving obstacle according to an embodiment of the present disclosure.

FIG. 5 is a block diagram of an apparatus for calibrating a posture of a moving obstacle according to an embodiment of the present disclosure. As illustrated in FIG. 5, the apparatus may be configured in the computer device. The apparatus includes a data obtaining module 501, a first information determining module 502, a second information determining module 503, and an obstacle joining module 504.

The data obtaining module 501 is configured to obtain a 3D map, and select a frame of point cloud data associated with the 3D map as a target frame of data, the 3D map comprising first static obstacles, the target frame of data comprising second static obstacles and one or more moving obstacles. The first information determining module 502 is configured to determine posture information of each of the one or more moving obstacles in a coordinate system of the 3D map. The second information determining module 503 is configured to register the target frame of data with the 3D map, and determining posture offset information of the target frame of data in the coordinate system according to a registration result. The obstacle joining module 504 is configured to calibrate the posture information of each of the one or more moving obstacles according to the posture offset information, and add each of the one or more moving obstacles into the 3D map.

With the apparatus for calibrating the posture of the moving obstacle provided by embodiments of the present disclosure, the frame of point cloud data associated with the 3D map is selected as the target frame of data, in which the 3D map includes the static obstacles, and the target frame of data includes the static obstacles and the one or more moving obstacles; the target frame of data is registered with the 3D map to obtain a registration result, and the posture offset information of the target frame of data in the coordinate system is determined according to the registration result; and the posture information of the moving obstacle (included in the target frame of data) in the coordinate system of the 3D map is calibrated according to the posture offset information. The method may correct the position and the orientation of the obstacle during the simulation of point cloud data, to reduce errors and improve an accuracy.

On the basis of the above embodiments, the second information determining module 503 may include an initial registration unit, an obstacle splitting unit, and a first precise registration unit. The initial registration unit is configured to obtain one of the second static obstacles as a reference obstacle, and pair the reference obstacle with the first static obstacles in the 3D map to obtain a pairing result, and perform an initial registration for the target frame of data in the 3D map according to the pairing result. The obstacle splitting unit is configured to split one of the second static obstacles after the initial registration using a cube with a preset size, to form feature points with a preset granularity. The first precise registration unit is configured to perform a first precise registration for the target frame of data in the 3D map according to the obtained feature points.

On the basis of the above embodiments, the second information determining module 503 may further include a second precise registration unit. The second precise registration unit is configured to perform a second precise registration for the target frame of data in the 3D map after the first precise registration using a point-to-point registration technique.

On the basis of the above embodiments, the initial registration unit may include a region determining subunit, an obstacle searching subunit, and an initial registration subunit. The region determining subunit is configured to determine a searching region in the coordinate system according to the posture information of the reference obstacle in the coordinate system. The obstacle searching subunit is configured to search a first static obstacle matching with the reference obstacle as a calibration obstacle according to the searching region. The initial registration subunit is configured to perform the initial registration for the target frame of data in the 3D map according to the posture information of the calibration obstacle in the coordinate system and the posture information of the reference obstacle in the coordinate system.

On the basis of the above embodiments, the initial registration unit may further include an obstacle deleting subunit. The obstacle deleting subunit is configured to delete the one or more moving obstacles from the target frame of data.

On the basis of the above embodiments, a pasting plane searching module and a bottom pasting module may be provided. The pasting plane searching module is configured to search a plane associated with each of the one or more moving obstacles as a pasting plane in the 3D map. The bottom pasting module is configured to paste a bottom of each of the one or more moving obstacles in the 3D map with the pasting plane.

On the basis of the above embodiments, the pasting plane searching module may include a movement track obtaining unit and a pasting plane determining unit. The movement track obtaining unit is configured to, in response to at least two planes comprised in a set region associated with a same moving obstacle in the 3D map, obtain a movement track of a road collection device associated with the 3D map. The pasting plane determining unit is configured to determine the pasting plane from the at least two planes according to the movement track of the road collecting device.

The apparatus provided by embodiments of the present disclosure may execute the method provided by any one of embodiments of the present disclosure. The apparatus has corresponding functional modules and beneficial effects to implement the method.

Figure 6:
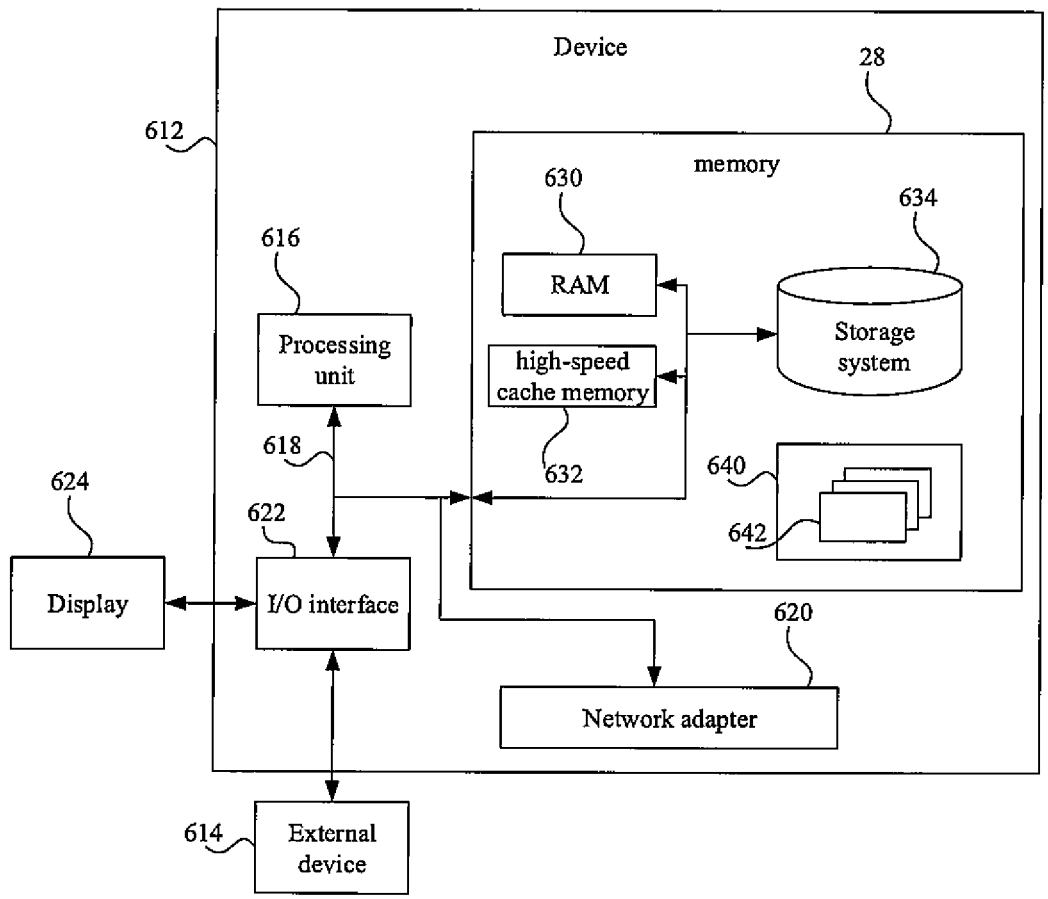
FIG. 6 is a block diagram of a device according to an embodiment of the present disclosure.

FIG. 6 is a block diagram of a device according to an embodiment of the present disclosure. FIG. 6 is a block diagram of an exemplary device 612 for implementing embodiments of the present disclosure. The device 612 illustrated in FIG. 6 is only illustrated as an example, and should not be considered as any restriction on the function and the usage range of embodiments of the present disclosure.

As illustrated in FIG. 6, the device 612 is in the form of a general-purpose computing apparatus. The device 612 may include, but is not limited to, one or more processors or processing units 616, a system memory 628, and a bus 618 connecting different system components (including the system memory 628 and the processing unit 616).

The bus 618 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronic standards association (VESA) local bus, and a peripheral component interconnect (PCI) bus.

Typically, the device 612 may include multiple kinds of computer-readable media. These media may be any storage media accessible by the device 612, including transitory or non-transitory storage medium and movable or Immovable storage medium.

The memory 628 may include a computer-readable medium in a form of volatile memory, such as a random access memory (RAM) 30 and/or a high-speed cache memory 632. The device 612 may further include other transitory/non-transitory storage media and movable/unmovable storage media. In way of example only, the storage system 634 may be used to read and write non-removable, non-volatile magnetic media (not shown in FIG. 6, commonly referred to as "hard disk drives"). Although not illustrated in FIG. 6, it may be provided a disk driver for reading and writing movable non-volatile magnetic disks (e.g. "floppy disks"), as well as an optical driver for reading and writing movable non-volatile optical disks (e.g. a compact disc read only memory (CD-ROM, a digital video disc read only Memory (DVD-ROM), or other optical media). In these cases, each driver may be connected to the bus 618 via one or more data medium interfaces. The memory 628 may include at least one program product, which has a set of (for example at least one) program modules configured to perform the functions of embodiments of the present disclosure.

A program/application 640 with a set of (at least one) program modules 642 may be stored in memory 628, the program modules 642 may include, but not limit to, an operating system, one or more application programs, other program modules and program data, and any one or combination of above examples may include an implementation in a network environment. The program modules 642 are generally configured to implement functions and/or methods described in embodiments of the present disclosure.

The device 612 may also communicate with one or more external devices 614 (e.g., a keyboard, a pointing device, a display 624, and etc.) and may also communicate with one or more devices that enables a user to interact with the computer system/server 612, and/or any device (e.g., a network card, a modem, and etc.) that enables the computer system/server 612 to communicate with one or more other computing devices. This kind of communication can be achieved by the input/output (I/O) interface 622. In addition, the device 612 may be connected to and communicate with one or more networks such as a local area network (LAN), a wide area network (WAN) and/or a public network such as the Internet through a network adapter 20. As illustrated, the network adapter 620 communicates with other modules of the device 612 over bus 618. It should be understood that although not shown in the figure, other hardware and/or software modules may be used in combination with the device 612, which including, but not limited to, microcode, device drivers, redundant processing units, external disk drive arrays, RAID systems, tape drives, as well as data backup storage systems and the like.

The device 612 may be a terminal. The processing unit 616 may perform various functional applications and data processing by running programs stored in the system memory 628, for example, to perform the method for calibrating the posture of the moving obstacle provided by embodiments of the present disclosure. In detail, the method may include: obtaining a 3D map, the 3D map comprising first static obstacles; selecting a frame of point cloud data associated with the 3D map as a target frame of data, the target frame of data comprising second static obstacles and one or more moving obstacles; determining posture information of each of the one or more moving obstacles in a coordinate system of the 3D map; registering the target frame of data with the 3D map; determining posture offset information of the target frame of data in the coordinate system according to a registration result; calibrating the posture information of each of the one or more moving obstacles according to the posture offset information; and adding each of the one or more moving obstacles after the calibrating into the 3D map.

An embodiment of the present disclosure further provides a computer readable storage medium, stored thereon with computer programs that, when executed by a processor, perform the method for calibrating the posture of the moving obstacle provided by embodiments of the present disclosure. In detail, the method may include: obtaining a 3D map, the 3D map comprising first static obstacles; selecting a frame of point cloud data associated with the 3D map as a target frame of data, the target frame of data comprising second static obstacles and one or more moving obstacles; determining posture information of each of the one or more moving obstacles in a coordinate system of the 3D map; registering the target frame of data with the 3D map; determining posture offset information of the target frame of data in the coordinate system according to a registration result; calibrating the posture information of each of the one or more moving obstacles according to the posture offset information; and adding each of the one or more moving obstacles after the calibrating into the 3D map.

The storage medium of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of carrier which carries a computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for calibrating a posture of a moving obstacle, comprising:
   obtaining a three-dimensional (3D) map, the 3D map comprising first static obstacles;
   selecting a frame of point cloud data associated with the 3D map as a target frame of data, the target frame of data comprising second static obstacles and one or more moving obstacles;
   determining posture information of each of the one or more moving obstacles in a coordinate system of the 3D map;
   registering the target frame of data with the 3D map;
   determining posture offset information of the target frame of data in the coordinate system according to a registration result;
   calibrating the posture information of each of the one or more moving obstacles according to the posture offset information; and
   adding each of the one or more moving obstacles after the calibrating into the 3D map,
   wherein, registering the target frame of data with the 3D map, comprises:
   obtaining one of the second static obstacles as a reference obstacle;
   pairing the reference obstacle with the first static obstacles to obtain a pairing result;
   performing an initial registration for the target frame of data in the 3D map according to the pairing result;
   splitting one of the second static obstacles after the initial registration using a cube with a preset size, to form feature points with a preset granularity; and
   performing a first precise registration for the target frame of data in the 3D map according to the obtained feature points,
   wherein, pairing the reference obstacle with the first static obstacles to obtain the pairing result, and performing the initial registration for the target frame of data in the 3D map according to the pairing result, comprises:
   determining a searching region in the coordinate system according to the posture information of the reference obstacle in the coordinate system;
   searching a first static obstacle matching with the reference obstacle as a calibration obstacle according to the searching region; and
   performing the initial registration for the target frame of data in the 3D map according to the posture information of the calibration obstacle in the coordinate system and the posture information of the reference obstacle in the coordinate system.

2. The method of claim 1, further comprising:
   performing a second precise registration for the target frame of data in the 3D map after the first precise registration using a point-to-point registration technique.

3. The method of claim 1, further comprising:
   deleting the one or more moving obstacles from the target frame of data.

4. The method of claim 1, further comprising:
   searching a plane associated with each of the one or more moving obstacles as a pasting plane in the 3D map; and
   pasting a bottom of each of the one or more moving obstacles in the 3D map with the pasting plane.

5. The method of claim 4, wherein, searching the plane associated with each of the one or more moving obstacles as the pasting plane in the 3D map, comprises:
   in response to at least two planes comprised in a set region associated with a same moving obstacle in the 3D map, obtaining a movement track of a road collection device associated with the 3D map; and
   determining the pasting plane from the at least two planes according to the movement track of the road collection device.

6. A device, comprising:
   one or more processors; and
   a memory configured to store one or more programs,
   wherein when the one or more programs are executed by the one or more processors, the one or more processors are caused to perform:

obtaining a three-dimensional (3D) map, the 3D map comprising first static obstacles;

selecting a frame of point cloud data associated with the 3D map as a target frame of data, the target frame of data comprising second static obstacles and one or more moving obstacles;

determining posture information of each of the one or more moving obstacles in a coordinate system of the 3D map;

registering the target frame of data with the 3D map;

determining posture offset information of the target frame of data in the coordinate system according to a registration result;

calibrating the posture information of each of the one or more moving obstacles according to the posture offset information; and adding each of the one or more moving obstacles after the calibrating into the 3D map, wherein, registering the target frame of data with the 3D map, comprises:

obtaining one of the second static obstacles as a reference obstacle;

pairing the reference obstacle with the first static obstacles to obtain a pairing result:

performing an initial registration for the target frame of data in the 3D map according to the pairing result;

splitting one of the second static obstacles after the initial registration using a cube with a preset size, to form feature points with a preset granularity; and performing a first precise registration for the target frame of data in the 3D map according to the obtained feature points, wherein, pairing the reference obstacle with the first static obstacles to obtain the pairing result, and performing the initial registration for the target frame of data in the 3D map according to the pairing result, comprises:

determining a searching region in the coordinate system according to the posture information of the reference obstacle in the coordinate system;

searching a first static obstacle matching with the reference obstacle as a calibration obstacle according to the searching region; and performing the initial registration for the target frame of data in the 3D map according to the posture information of the calibration obstacle in the coordinate system and the posture information of the reference obstacle in the coordinate system.

7. The device of claim 6, wherein, when the one or more programs are executed by the one or more processors, the one or more processors are caused to further perform:

performing a second precise registration for the target frame of data in the 3D map after the first precise registration using a point-to-point registration technique.

8. The device of claim 6, wherein, when the one or more programs are executed by the one or more processors, the one or more processors are caused to further perform:

deleting the one or more moving obstacles from the target frame of data.

9. The device of claim 6, wherein, when the one or more programs are executed by the one or more processors, the one or more processors are caused to further perform:

searching a plane associated with each of the one or more moving obstacles as a pasting plane in the 3D map; and pasting a bottom of each of the one or more moving obstacles in the 3D map with the pasting plane.

10. The device of claim 9, wherein, searching the plane associated with each of the one or more moving obstacles as the pasting plane in the 3D map, comprises:

in response to at least two planes comprised in a set region associated with a same moving obstacle in the 3D map, obtaining a movement track of a road collection device associated with the 3D map; and determining the pasting plane from the at least two planes according to the movement track of the road collection device.

11. A non-transient computer readable storage medium, stored thereon with computer programs that, when executed by a processor, perform a method, the method comprising:

obtaining a three-dimensional (3D) map, the 3D map comprising first static obstacles;

selecting a frame of point cloud data associated with the 3D map as a target frame of data, the target frame of data comprising second static obstacles and one or more moving obstacles;

determining posture information of each of the one or more moving obstacles in a coordinate system of the 3D map;

registering the target frame of data with the 3D map;

determining posture offset information of the target frame of data in the coordinate system according to a registration result;

calibrating the posture information of each of the one or more moving obstacles according to the posture offset information; and adding each of the one or more moving obstacles after the calibrating into the 3D map, wherein, registering the target frame of data with the 3D map, comprises:

obtaining one of the second static obstacles as a reference obstacle;

pairing the reference obstacle with the first static obstacles to obtain a pairing result:

performing an initial registration for the target frame of data in the 3D map according to the pairing result;

splitting one of the second static obstacles after the initial registration using a cube with a preset size, to form feature points with a preset granularity; and performing a first precise registration for the target frame of data in the 3D map according to the obtained feature points, wherein, pairing the reference obstacle with the first static obstacles to obtain the pairing result, and performing the initial registration for the target frame of data in the 3D map according to the pairing result, comprises:

determining a searching region in the coordinate system according to the posture information of the reference obstacle in the coordinate system;

searching a first static obstacle matching with the reference obstacle as a calibration obstacle according to the searching region; and performing the initial registration for the target frame of data in the 3D map according to the posture information of the calibration obstacle in the coordinate system and the posture information of the reference obstacle in the coordinate system.

12. The non-transient computer readable storage medium of claim 11, wherein the method further comprises:

performing a second precise registration for the target frame of data in the 3D map after the first precise registration using a point-to-point registration technique.

13. The non-transient computer readable storage medium of claim 11, wherein the method further comprises:
   deleting the one or more moving obstacles from the target frame of data.

14. The non-transient computer readable storage medium of claim 11, wherein the method further comprises:
   searching a plane associated with each of the one or more moving obstacles as a pasting plane in the 3D map; and
   pasting a bottom of each of the one or more moving obstacles in the 3D map with the pasting plane.

15. The non-transient computer readable storage medium of claim 14, wherein, searching the plane associated with each of the one or more moving obstacles as the pasting plane in the 3D map, comprises:
   in response to at least two planes comprised in a set region associated with a same moving obstacle in the 3D map, obtaining a movement track of a road collection device associated with the 3D map; and
   determining the pasting plane from the at least two planes according to the movement track of the road collection device.

* * * * *